April 11, 1967  J. E. MEGLES  3,313,609
METHOD OF MAKING HIGH STRENGTH NEPHELINE CRYSTALLINE GLASS
Filed June 18, 1963
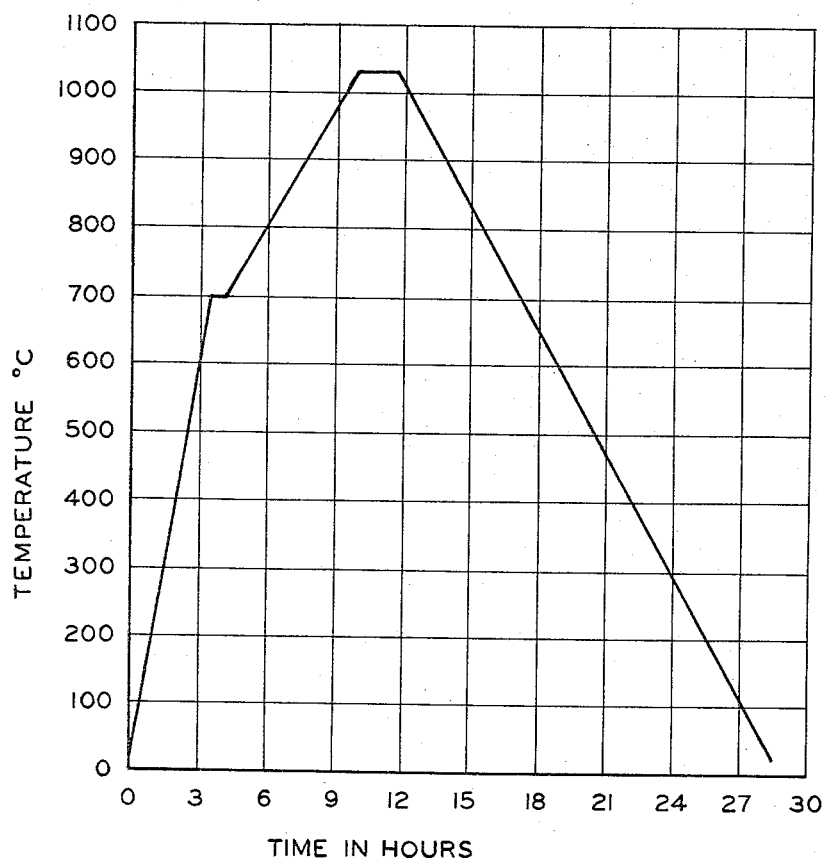
INVENTOR.
John E. Megles
BY Clarence R. Patty, Jr.
ATTORNEY 3,313,609
METHOD OF MAKING HIGH STRENGTH NEPHELINE CRYSTALLINE GLASS
John E. Megles, Corning, N.Y., assignor to Corning Glass Works, Corning, N.Y., a corporation of New York
Filed June 18, 1963, Ser. No. 288,788
6 Claims. (Cl. 65—33)

This invention relates to glass-ceramic bodies of high mechanical strength. More specifically, this invention relates to a particular method of manufacturing glass-ceramic bodies possessing high mechanical strength wherein the major crystalline component thereof is nepheline.

Since the original discovery of a practical method of producing glass-ceramics by Stanley D. Stookey, as set forth in United States Patent No. 2,920,971, many uses for these materials have been proposed successfully. One particular use of exceptionally high potential volume has been recognized to lie in the manufacture of dinnerware, i.e., the cups, saucers, plates, etc., used in every home. However, it has been realized that in order to successfully compete with the presently available china products, the glass-ceramic must have substantially better physical and chemical properties and exhibit an appearance at least on a par with it aesthetically The search for these qualities has led to extensive fundamental and applied research in order to develop a product eminently suitable for this use.

As explained in detail in the above-mentioned United States Patent No. 2,920,971, the manufacture of glass-ceramic or semi-crystalline ceramic bodies generally contemplates the controlled crystallization of a glass in situ through a specific heat treatment. The process normally comprises introducing a nucleation or crystallization-promoting agent into the glass batch, melting the batch, simultaneously forming and cooling the melt into a glass shape of a desired configuration, and thereafter heat treating the shape by means of a precisely defined time-temperature schedule. This heat treatment converts the glass shape into an article consisting essentially of finely divided crystals randomly, but substantially uniformly, dispersed throughout a glassy matrix and comprising a major proportion of the mass of said article. The glass-ceramic or semicrystalline ceramic article generally exhibits a physical appearance and properties differing substantially from those of the base glass.

Laboratory testing and field experience have shown that a satisfactory glass-ceramic dinnerware product must possess: high mechanical strength, good thermal shock resistance, extremely low and, preferably, no porosity, and good chemical durability, i.e., demonstrate good resistance to attack by acids and detergents. Coupled with these physical and chemical characteristics, the body must exhibit the appearance, the texture, the whiteness of china.

The principal object, therefore, of this invention is to provide a glass-ceramic body possessing high mechanical strength, good thermal shock resistance, extremely low porosity, good chemical durability, and exhibiting the aesthetic qualities of china.

Another object of this invention is to provide a method of manufacturing a glass-ceramic body possessing high mechanical strength, good thermal shock resistance, extremely low porosity, good chemical durability, and exhibiting the aesthetic qualities of china.

Still another object of this invention is to provide a glass-ceramic body particularly useful as dinnerware.

Other objects will become apparent from the following description and the accompanying drawing which sets forth a time-temperature curve for the heat treatment of a specific embodiment of this invention.

I have discovered that the above objects can be attained through the careful heat treatment of a glass body containing, on a weight percent basis, about 48–51% $SiO_2$, 24–27% $Al_2O_3$, 15–18% $Na_2O$, 3–6% $TiO_2$, and 1–3% $MgO$. In its broadest terms, my invention comprises the heat treatment of a glass body consisting essentially of the above composition by exposing it to a temperature of about 650°–850° C. for a period of time sufficient to initiate nucleation, then raising the temperature to about 900°–1050° C. and holding it thereat until the desired crystallization is attained, and finally cooling to room temperature. Active precipitation of nepheline is pronounced at about 900° C.

The heat treatment of bodies of this composition causes the crystallization of nepheline in situ in the glassy matrix of the original glass article. The above-cited ranges of $SiO_2$, $Al_2O_3$, $Na_2O$, $TiO_2$, and $MgO$ have been found to be critical in yielding a nepheline-containing body which will have the desired thermal shock resistance and chemical durability. It is the heat treatment, however, which insures the high strength and physical appearance demanded in the product. The increase in strength which can be brought about by following the heat treating schedule of this invention is not fully understood and it is only postulated that it is due in some manner to the mechanics of crystallization of the nepheline.

Table I illustrates examples having compositions included within the aforementioned ranges, as analyzed on an oxide basis in weight percent, exclusive of minor impurities which may have been present in the batch materials. The batch ingredients may comprise any materials, either oxides or other compounds, which, on being fused together, are converted to the desired oxide compositions in the desired proportions. A fining agent was generally added to the batch also. In most instances, this fining agent was $As_2O_3$ and was normally present in the batch in an amount up to about 1% by weight. The $As_2O_3$ was omitted from this table for convenience, since the residual amount remaining in the glass is too small to have any material effect on its fundamental properties. Table I also sets forth the batch components, in parts by weight, used in compounding Example No. 2, my preferred composition.

TABLE I

|  | 1 | 2 |  |  |
|---|---|---|---|---|
| $SiO_2$ | 49.98 | 50.2 | Sand | 496.9 |
| $Al_2O_3$ | 26.18 | 26.0 | Soda Ash | 270.4 |
| $Na_2O$ | 17.1 | 16.68 | $Al_2O_3$ | 261.2 |
| $TiO_2$ | 4.58 | 5.96 | MgO | 22.0 |
| MgO | 2.16 | 2.16 | $TiO_2$ | 45.5 |
|  |  |  | $As_2O_3$ | 5.8 |
|  |  |  | Sodium Nitrate | 35.0 |

Although any of the well-known methods for forming glass shapes such as blowing, casting, drawing, pressing, rolling, or spinning may be employed in the practice of the invention, the required batch materials for each of the above examples were compounded, the batches then melted for at least 4 hours at about 1500° C. in crucibles, pots, or tanks, depending upon the quantity of product desired, and the melt drawn into cane for testing purposes or pressed into dinnerware shapes utilizing conventional drawing and pressing techniques. In most instances, the resultant glass shapes were quickly cooled to room temperature to permit a visual inspection for defects and to enable the coating of the shapes with a glaze or other decorative medium, if such is desired. However, where speed of operation and economics in fuel costs are demanded, these glass shapes may be cooled to the transformation point only and the heat treating procedure begun at once. The transformation point is considered to be that temperature whereat the molten glass becomes an amorphous solid, generally in the vicinity of the annealing point of the glass. The annealing points of the glasses of this invention range from about 660°–680° C. Following the cooling step, the glass shapes are placed in a furnace and heated to the temperature of the first level of heat treatment, the nucleation temperature. After satisfactory nucleation has been initiated, the temperature of the body is raised to the second level of heat treatment, the crystallization temperature. Finally, the semicrystalline bodies are cooled to room temperature.

It will be appreciated that the rate of heating of these glass bodies depends upon several factors: the physical size and configuration of the bodies; the speed of crystallization development within the body; and the use of physical supporting means to inhibit deformation of the glass body as it is raised above its softening point. Thus, where the mass or wall thickness of a particular shape is small, the body may be heated rapidly without fear of thermal breakage, but where these dimensions are large more care must be exercised in this heating step. As was pointed out above, the glass body is heated above its transformation point in order to initiate nucleation after which the temperature is raised still higher to expedite and increase crystallization. It is known that crystallization occurs more rapidly as the temperature of the body approaches the liquidus of the crystal phase. It will be understood that as the glass body is heated above the transformation point, softening of the body can occur resulting in deformation. Nevertheless, the softening point and, therefore, the deformation temperature of the glass-ceramic body is substantially higher than that of the original glass. Hence, it is apparent that the rate of heating of the glass body should be balanced against the speed at which crystals are formed within the body. Too rapid heating will not allow the formation of enough crystals to support the body and slumping will occur. This problem of deformation can be alleviated to a great extent where the shape of the glass body is such that the use of physical supporting means is possible during the heat treating cycle, as will be explained hereinafter.

I have discovered that the glass bodies of this invention may be heated rapidly, i.e., up to 10° C./minute, from room temperature to the lower extreme of the nucleation range (650° C.), whether physical supports are used for the ware or not, without harmful deformation. I have further learned that with proper physical supports the glass bodies can be heated at this rate through the nucleation range and up to the crystallization range without excessive deformation. Nucleation of these glasses is so rapid that no formal dwell time within the nucleation range is required to insure satisfactory internal support and final crystallization. At the lower extreme of the crystallization range (900° C.) a minimum exposure of one hour and, preferably, 3–4 hours develops a useable product whereas at 1050° C. an exposure of only one-half hour and preferably, 1–2 hours, will yield a satisfactory product. Longer exposure times at these temperatures yield somewhat denser crystallization, but the further development of such crystallization rapidly decreases so that it is not practical economically to continue the heat treatment much beyond these preferred times.

The unsupported bodies must be heated with more care. I have found that the glass bodies should not be heated more rapidly than about 1° C./minute in the nucleation range unless at least one hold period of about 1 hour at some temperature within this range is utilized. After such a dwell period, sufficient nucleation is initiated to support the body to permit a rate of temperature increase up to about 5° C./minute through the remainder of nucleation range and into the crystallization range. Actually, I have discovered that bodies having the highest mechanical strength are produced where the temperature of the body is steadily raised at 1° C./minute or less throughout the whole nucleation range. This rate is sufficiently slow that no dwell period is needed and, yet, deformation is negligible. The body can then be raised at rates up to about 5° C./minute in the crystallization range. As these bodies spend a longer time within the nucleation range than in the case of the supported bodies, the dwell time in the crystallization range may be shortened considerably. Where the body has been steadily heated at 1° C./minute or less through the entire nucleation range, a satisfactorily crystallized body has been obtained with no dwell time even at the lower extreme of the crystallization range. Likewise, where a holding period in the nucleation range is utilized followed by a faster rise in temperature to the crystallization range, no dwell time in the crystallization range has been found mandatory. Nevertheless, denser crystallization and a whiter appearance can be obtained with a hold period of some time in the crystallization range. Therefore, the preferred practice consists of utilizing the dwell times found suitable when the ware is supported, viz., about 1–4 hours at the lower extreme of the crystallization range and about ½–2 hours at the higher. Here, again, longer dwell times may be employed but there is no particular advantage in doing so.

Although satisfactory bodies have been obtained, in the case of supported ware, where they were merely heated rapidly through the nucleation range, thus spending but about ½-hour in this range, I have found that the crystal density of the bodies is greater, the crystallinity more homogeneous, and the mechanical strength higher when at least one hold period of about ½-hour is utilized in the nucleation range. This, then, represents my preferred practice.

The rate of cooling the glass-ceramic body to room temperature is governed by size, shape, thickness, thickness distribution, and the resistance to thermal shock inherent in the body. Small shapes and drawn cane can be removed from the furnace immediately after the second step of the heat treating schedule has been completed and cooled in the ambient atmosphere. Large shapes must be cooled more cautiously. I have discovered, however, that the mechanical strength of the semicrystalline ware is somewhat greater where a slow cooling cycle is followed, i.e., at a rate not exceeding about 3° C./minute. In the laboratory, such a cooling rate was attained by merely cutting off the supply of heat to the furnace and permitting the furnace to cool with the glass-ceramic shapes retained therein. This use of a slow cooling rate thus reflects my preferred practice.

Table II records a number of heat treating schedules carried out in a gas-fired laboratory furnace and the moduli of rupture resulting therefrom. The modulus of rupture measurements (p.s.i.) were obtained through the conventional methods using rods cut from dinnerware which has been abraded with #30 grit silicon carbide. Each of these schedules was begun at room temperature and was run on Example 2, my preferred composition.

TABLE II

| Run No. | Cycle | Modulus of Rupture |
|---|---|---|
| A (dinnerware supported). | Heat to 820° C. at 5° C./min<br>Hold for 1 hour<br>Heat to 1,020° C. at 5° C./min<br>Cool at furnace rate | 11,870 |
| B (dinnerware supported). | Heat to 720° C. at 5° C./min<br>Hold for ½ hour<br>Heat to 820° C. at 100° C./hr<br>Hold for 4 hours<br>Heat to 1,020° C. at 5° C./min<br>Cool at furnace rate | 11,980 |
| C (dinnerware supported). | Heat to 700° C. at 200° C./hr<br>Hold for ½ hour<br>Heat to 1,040° C. at 1° C./min<br>Hold for 2 hours<br>Cool at furnace rate | 14,270 |
| D (dinnerware not supported). | Heat to 650° C. at 200° C./hr<br>Heat to 1,020° C. at ½° C./min<br>Cool at 2° C./min | 11,050 |
| E (dinnerware not supported). | Heat to 650° C. at 100° C./hr<br>Heat to 980° C. at 1° C./min<br>Hold for 2 hours<br>Cool at 2° C./min | 11,320 |
| F (dinnerware not supported). | Heat to 680° C. at 100° C./hr<br>Heat to 1,000° C. at 1° C./min<br>Hold for 1 hour<br>Cool at 2° C./min | 12,150 |
| G (dinnerware not supported). | Heat to 680° C. at 200° C./hr<br>Heat to 980° C. at ¼° C./min<br>Hold for 3 hours<br>Cool at 2° C./min | 13,050 |
| H (dinnerware supported). | Heat to 780° C. at 5° C./min<br>Heat to 1,000° C. at 200° C./hr<br>Cool at furnace rate | 9,790 |
| I (dinnerware not supported). | Heat to 680° C. at 100° C./hr<br>Heat to 1,000° C. at ½° C./min<br>Hold for 2 hours<br>Cool at furnace rate | 12,590 |
| J (dinnerware supported). | Heat to 750° C. at 100° C./hr<br>Heat to 1,060° C. at ½° C./min<br>Hold for 3 hours<br>Cool at furnace rate | Furnace too hot. Much deformation. Sample stuck to kiln supports. |

Table II demonstrates the criticality of the heat treatment in yielding a body of high strength. Thus, the modulus of rupture could be varied from 9,790 p.s.i. in Run No. H to 14,270 p.s.i. in Run No. C by merely modifying the heat treating cycle. Schedule C has been chosen as the preferred embodiment of the invention. Schedule H is typical of the strengths obtained where fast heating cycles with no dwell periods are utilized in the nucleation or crystallization ranges. These bodies, while useable, do not possess the strengths furnished by slower heating schedules such as exhibited in Schedule D. Run No. J demonstrates that a final crystallization temperature of 1060° C. is too high for these bodies.

My invention, then, provides a means for manufacturing semicrystalline ceramic bodies having nepheline as the primary crystal phase which exhibit high mechanical strength. Other good qualities residing in the particular compositions of these bodies are: excellent surface durability to acids and detergents; satisfactory flameworking characteristics; excellent homogeneous white color; and the ease with which it lends itself to glazing and other decorative processes.

The crystal content of these bodies has been determined to be at least about 30% by weight, but is generally, and preferably, greater than 50% by weight. This factor is dependent upon the extent to which the components of the batch are adaptable to the formation of crystal phases. The crystals, themselves, are very fine-grained, i.e., they are substantially all finer than about 30 microns in diameter, and are randomly dispersed throughout the glassy matrix.

The accompanying graph records a time-temperature curve for the preferred heat treatment (Schedule No. C of Table II) of this invention wherein after the batch had been melted, as, for example, by heating in an open crucible at a temperature of about 1500° C. for about 4 hours, shaped, and cooled to room temperature, the glass shape was placed upon refractory supporting means and given the following heat treatment: the temperature was raised to 700° C. at 200° C./hour, maintained thereat for ½-hour, thereafter the temperature was raised to 1040° C. at 1° C./minute, maintained thereat for 2 hours, and then cooled at furnace rate (about 1° C./minute) to room temperature.

What is claimed is:

1. A method for manufacturing a glass-ceramic body possessing a modulus of rupture when abraded of at least about 9790 p.s.i. wherein nepheline constitutes the principal crystal phase which comprises melting a batch for a glass composition consisting essentially, by weight on the oxide basis, of 48–51% $SiO_2$, 24–27% $Al_2O_3$, 15–18% $Na_2O$, 3–6% $TiO_2$, and 1–3% MgO, simultaneously cooling the melt at least below the transformation point of the melt and shaping a glass body therefrom, placing said glass body on supporting means, and thereafter heating said glass body at a rate not exceeding about 10° C./minute to a temperature between about 650°–850° C., maintaining said glass body within said range of temperatures for at least about ½-hour, subsequently heating said body at a rate not exceeding about 10° C./minute to a temperature between about 900°–1050° C., maintaining said body within said range of temperatures for a period of time varying from at least about one hour at the lower extreme of said range to at least about ½-hour at the upper extreme of said range to attain the crystallization of nepheline, and then cooling said body to room temperature.

2. A method according to claim 1 wherein the body is maintained within the 900–1050° C. temperature range for a time varying from about 1–4 hours at the lower extreme of said range to about ½–2 hours at the upper extreme thereof.

3. A method according to claim 1 wherein the rate of cooling the body to room temperature does not exceed 3° C./minute.

4. A method for manufacturing a glass-ceramic body possessing a modulus of rupture when abraded of at least about 9790 p.s.i. wherein nepheline constitutes the principal crystal phase which comprises melting a batch for a glass composition consisting essentially, by weight on the oxide basis, of 48–51% $SiO_2$, 24–27% $Al_2O_3$, 15–18% $Na_2O$, 3–6% $TiO_2$, and 1–3% MgO, simultaneously cooling the melt at least below the transformation point of the melt and shaping a glass body therefrom, and thereafter heating said glass body at a rate not exceeding about 10° C./minute to a temperature of about 650° C., raising the temperature of said glass body at a rate not exceeding about 1° C./minute to a temperature between 650°–850° C., maintaining said glass body within said range of temperature for at least about one hour, subsequently heating said body at a rate not exceeding about 5° C./minute to a temperature between about 900°–1050° C. to attain the crystallization of nepheline, and then cooling said body to room temperature.

5. A method according to claim 4 wherein the body is maintained within the range of temperatures between 900°–1050° C. for a time varying from about 1–4 hours at the lower extreme of said range to about ½–2 hours at the upper extreme thereof.

6. A method according to claim 4 wherein the rate of cooling said body to room temperature does not exceed about 3° C./minute.

References Cited by the Examiner

UNITED STATES PATENTS

| | | | |
|---|---|---|---|
| 2,960,802 | 11/1960 | Voss | 65—33 |
| 3,013,362 | 12/1961 | Calkins et al. | 65—33 X |
| 3,113,877 | 12/1963 | Janakirama-Rao | 65—33 |
| 3,146,114 | 8/1964 | Kivlighn | 65—33 X |

(Other references on following page)

FOREIGN PATENTS 634,441    1/1962    Canada.
883,287    11/1961    Great Britain.

OTHER REFERENCES

"Phase Diagrams for Ceramists," by Levin, McMurdie and Hall, pub. by The American Ceramic Society, Columbus, Ohio, 1956, pages 14 to 34.

"Handbook of Glass Manufacture," vol. II, by Fay V. Tooley, pub. by Ogden Publishing Co., New York, N.Y., 1960, pages 187 to 199.

DONALL H. SYLVESTER, *Primary Examiner.*

F. W. MIGA, *Assistant Examiner.*